(12) United States Patent
Jehan

(10) Patent No.: US 7,842,874 B2
(45) Date of Patent: Nov. 30, 2010

(54) CREATING MUSIC BY CONCATENATIVE SYNTHESIS

(75) Inventor: Tristan Jehan, Somerville, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 580 days.

(21) Appl. No.: 11/763,741

(22) Filed: Jun. 15, 2007

(65) Prior Publication Data

US 2007/0291958 A1 Dec. 20, 2007

Related U.S. Application Data

(60) Provisional application No. 60/813,816, filed on Jun. 15, 2006.

(51) Int. Cl.
*A63H 5/00* (2006.01)
*G04B 13/00* (2006.01)
*G10H 7/00* (2006.01)

(52) U.S. Cl. .......................... 84/609; 84/634
(58) Field of Classification Search .................. 84/609, 84/634

See application file for complete search history.

(56) References Cited

U.S. PATENT DOCUMENTS

| | | | | |
|---|---|---|---|---|
| 5,281,754 | A * | 1/1994 | Farrett et al. | 84/609 |
| 5,663,517 | A * | 9/1997 | Oppenheim | 84/649 |
| 5,952,598 | A * | 9/1999 | Goede | 84/609 |
| 6,084,169 | A * | 7/2000 | Hasegawa et al. | 84/600 |
| 7,319,185 | B1 * | 1/2008 | Wieder | 84/609 |
| 7,626,112 | B2 * | 12/2009 | Miyajima | 84/609 |
| 2004/0112202 | A1 * | 6/2004 | Smith et al. | 84/609 |
| 2007/0289432 | A1 * | 12/2007 | Basu et al. | 84/609 |

OTHER PUBLICATIONS

Fastl, Hugo and Eberhard Zwicker, Psychoacoustics: Facts and Models, 3rd edition, 2007, Springer Verlag, Berlin, Germany.
Serra, Xavier, A System for Sound Analysis/Transformation/Synthesis Based on Deterministic Plus Stochastic Decomposition, PhD thesis, Oct. 1999, CCRMA, Department of Music, Stanford University, Stanford, CA.
Schwarz, Deimo, The Caterpillar System for Data-Driven Concatenative Sound Synthesis, Sep. 8-11, 2003, 6th International Conference on Digital Audio Effects (DAFx-03), London, UK.
Zils, Aymeric and Francois Pachet, Musical Mosaicing, Dec. 6-8, 2003, In Proceedings of the COST G-6 Conference on Digital Audio Effects (DAFx-01) Limerick, Ireland.
Jehan, Tristan, Perceptual Synthesis Engine: An Audio-Driven Timbre Generator, Sep. 2001, Massachusetts Institute of Technology, Cambridge, MA.
Jehan, Tristan, Event-Synchronous Music Analysis/Synthesis, Oct. 5-8, 2004, Proceedings of the 7th International Conference on Digital Audio Effects (DAFx'04), Naples, Italy.
Jehan, Tristan, Perceptual Segment Clustering for Music Description and Time-Axis Redundancy Cancellation, 2004, Massachusetts Institute of Technology Media Laboratory, Cambridge, MA.
Jehan, Tristan, Downbeat Prediction by Listening and Learning, Oct. 16-19, 2005, IEEE Workshop on Applications of Signal Processing to Audio and Acoustics, New Paltz, NY.
Jehan, Tristan, Hierarchical Multi-Class Self Similarities, Oct. 16-19, 2005, IEEE Workshop on Applications of Signal Processing to Audio and Acoustics, New Paltz, NY.
Scheirer, Eric, Music-Listening Systems, Jun. 2000, PhD thesis, Massachusetts Institute of Technology, Cambridge, MA.

* cited by examiner

*Primary Examiner*—Jeffrey Donels
(74) *Attorney, Agent, or Firm*—SoCal IP Law Group LLP; Mark A. Goldstein; Steven C. Sereboff

(57) ABSTRACT

Automated creation of new music by listening is disclosed. A method to create new music may comprise listening to a plurality of music, learning from the plurality of music, and performing concatenative synthesis based on the listening and the learning to create the new music. The method may be performed on a computing device having an audio interface, such as a personal computer.

28 Claims, 10 Drawing Sheets

CREATING MUSIC BY CONCATENATIVE SYNTHESIS

RELATED APPLICATION INFORMATION

This application claims benefit of the filing date of provisional patent application Ser. No. 60/813,816, filed Jun. 15, 2006, which is incorporated herein by reference in its entirety.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to automated music analysis and music creation based on the analysis.

2. Description of the Related Art

Can computers be creative? The question drives an old philosophical debate that goes back to Alan Turing's claim in 1950 that "a computational system can possess all important elements of human thinking or understanding." Creativity is one of those things that makes humans special, and is a key issue for artificial intelligence and cognitive sciences: if computers cannot be creative, then 1) they cannot be intelligent, and 2) people are not machines. Dartnall, Terry, "Artificial Intelligence and Creativity: an Interdisciplinary Approach" (Kluwer, Dordrecht, 1994)

The standard argument against computers' ability to create is that they merely follow instructions. Nonetheless, there have been several attempts at building creative machines.

Composing music is creating by putting sounds together. Composition is regarded as an elitist, almost mysterious ability, that requires years of training. If a computer brings into existence a piece of music by assembling sounds together, doesn't it compose music?

DETAILED DESCRIPTION

Throughout this description, the embodiments and examples shown should be considered as exemplars, rather than limitations on the apparatus and methods disclosed or claimed.

The methods described herein are directed to composing new music automatically by recycling preexisting music. The methods computationally model the process of creating music using experience from listening to examples. By recycling a database of existing songs, the methods compose and perform new songs with characteristics similar to the examples. The methods are based on the signal content of music, listen to the results, and analyze the results in relation to other music, as well as recycling produced new music. The methods model the life cycle of listening, composing, and performing, turning the computer into an active musician, instead of simply being an instrument.

Environment

Figure 1:
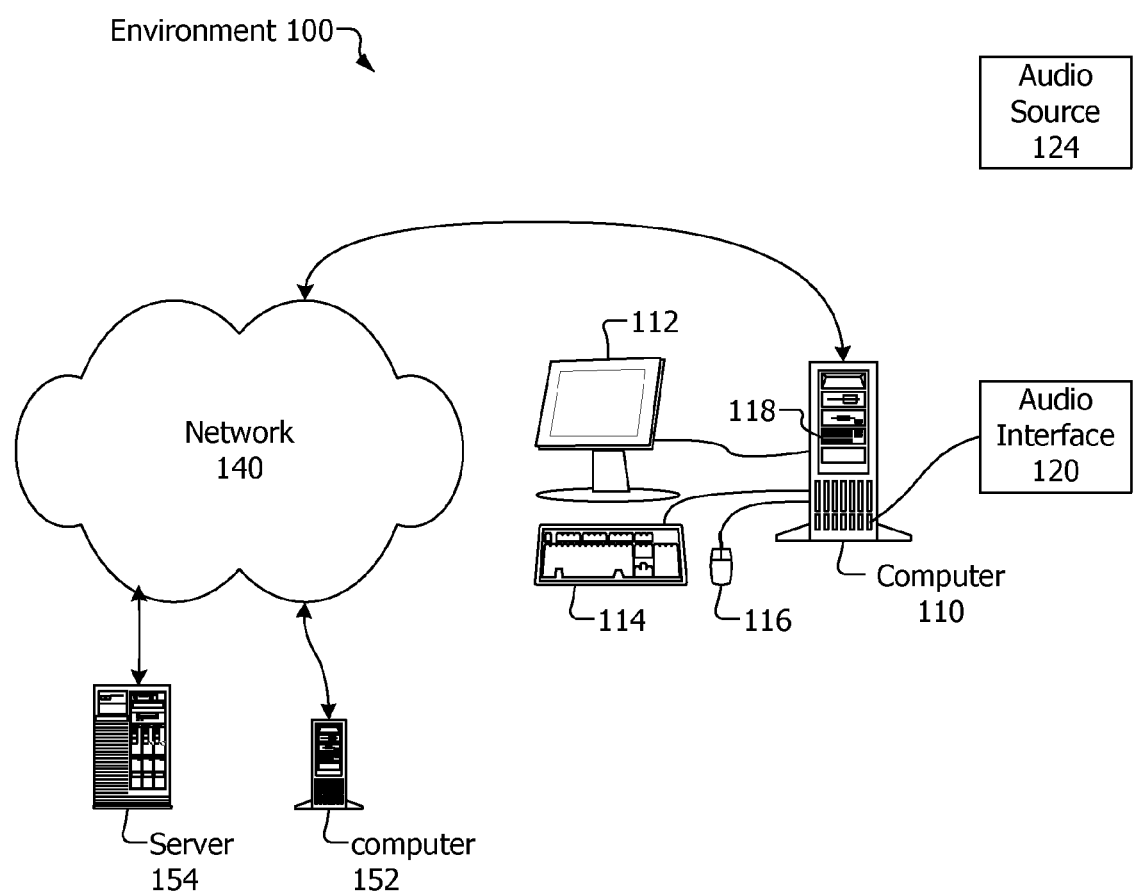
FIG. 1 is a is a block diagram of an environment in which the methods described herein may be implemented.

Referring now to FIG. 1, the environment 100 in which the methods described herein may be implemented is shown. The method may be implemented in software that executes on a personal computer 110 or other computing device. The personal computer 110 may include or be coupled with an audio interface 120 such as an analog to digital converter to receive sounds and music. The audio interface 120 may be coupled with the personal computer 110 via a wired or wireless connection, such as, for example, via Universal Serial Bus (USB), IEEE 1394 (also known as Firewire® and i.link®), infrared, WiFi (also known as IEEE 802.11), Bluetooth, and others, as well as via proprietary communications techniques. The audio interface 120 allows the personal computer 110 to hear, perceive, record and/or process sounds and music. The audio interface 120 may be considered an electronic ear. The audio source 124 or music may be a CD player, radio, MP3 player live performer, live performance or other source of audio information, namely music. The sounds and music may be in the form of songs, segments and samples in a well known or proprietary format, including, for example, as wavetable (WAV), Audio Interchange File Format (AIFF), Moving Picture Expert Group (MPEG) layer 3 audio (MP3), MPEG-4 Part 14 audio (MP4), Musical Instrument Digital Interface (MIDI), and related data and/or metadata.

The personal computer 110 may include or be coupled with a display 112. The personal computer 112 may be coupled with or include one or more user input devices, including, for example, keyboard 114, mouse 116, a track ball, a scroll wheel, a touch pad, a key pad, a touch screen, navigation buttons, a joystick, a pen and tablet, a stylus and touchscreen, and/or others. A user may use a user input device to click on, select, or otherwise activate or control a user interface item such as a button, link, slider, etc. and to provide input to the operating system or programs running on the personal computer via a graphical user interface, text interface or other user interface provided on the personal computer 110.

Although shown implemented in a personal computer, the processes and apparatus may be implemented with any computing device. A computing device as used herein refers to any device with a processor, memory and a storage device that may execute instructions including, but not limited to, personal computers, server computers, computing tablets, workstations, notebook computers, portable computers, and laptop computers. These computing devices may run an operating system, including, for example, variations of the Linux, Unix, Microsoft Windows, Solaris, and Apple Mac OS X operating systems.

A computing device may include software and/or hardware for providing the functionality and features described herein. A computing device may include one or more of: memories, software, storage devices, firmware, and processors. The processes, functionality and features may be embodied in whole or in part in software which operates on a computing device and may be in the form of an application program, an applet (e.g., a Java applet), a browser plug-in, a COM object, a dynamic linked library (DLL), a script, one or more subroutines, or an operating system component or service. The functions may be distributed such that some components are performed by one computing device and others by other computing devices.

The techniques discussed herein may be implemented in software stored on and accessible from a storage media in a storage device 118 included with or otherwise coupled or attached to a computing device. These storage media include, for example, magnetic media such as hard disks, floppy disks and tape; optical media such as compact disks (CD-ROM and CD-RW), digital versatile disks (DVD and DVD±RW) and high definition discs such as HD-DVD and Blu-Ray discs; flash memory cards; and other storage media. As used herein, a storage device is a device that allows for reading and/or writing to a storage medium. Storage devices include, hard disk drives, DVD drives, flash memory devices, and others.

The personal computer 110 may be coupled with and communicate over a network 140. Network 140 may be a wired or wireless network, or a combination thereof. The connection to the network 140 may be a wired or wireless connection. Network 140 may be or include the Internet, and may be a private network, local area network (LAN), wide area network (WAN), other network, or combination thereof. Executable software, source code, music content in the form of wave, MP3, and other format computer files may be received over network 140 from local and/or remote computers 152 and/or servers 154 that may include or be one or more databases, including a SQL database.

Description of Processes

Figure 2:
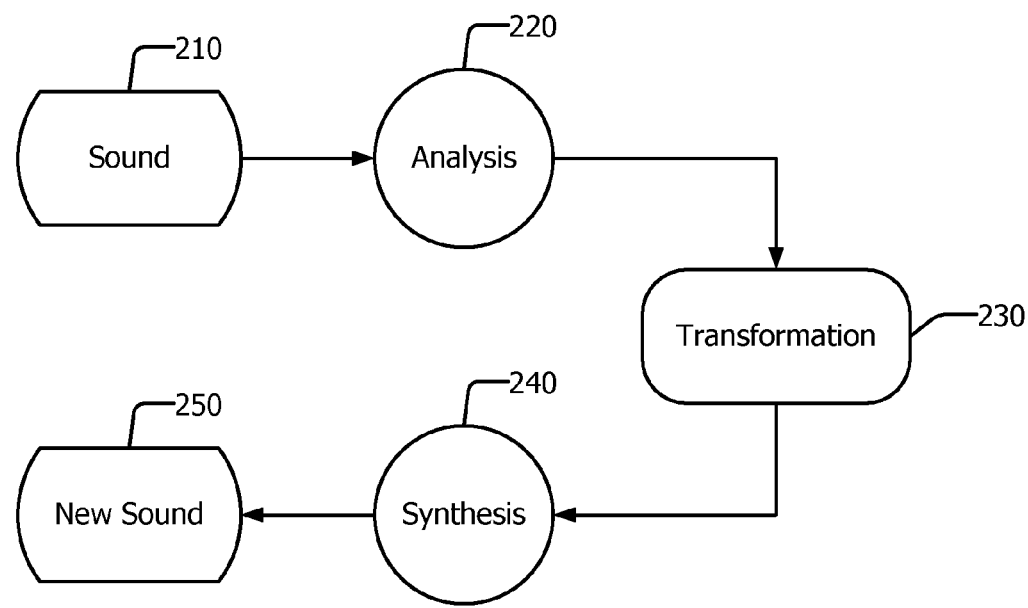
FIG. 2 is a block diagram of a method of a general paradigm of music analysis and synthesis.

The methods described herein are included in the general paradigm of analysis/re-synthesis. As depicted in FIG. 2, according to the method, a sound 210 is broken down into some essential, quantifiable components, e.g., amplitude and phase partial coefficients, in analysis block 220. The essential, quantifiable components may be altered in transformation block 230 for various applications including time stretching, pitch shifting, timbre morphing, or compression. Finally, the transformed parameters may be reassembled into a new sound 250 through a synthesis procedure 240, e.g., additive synthesis.

Figure 3:
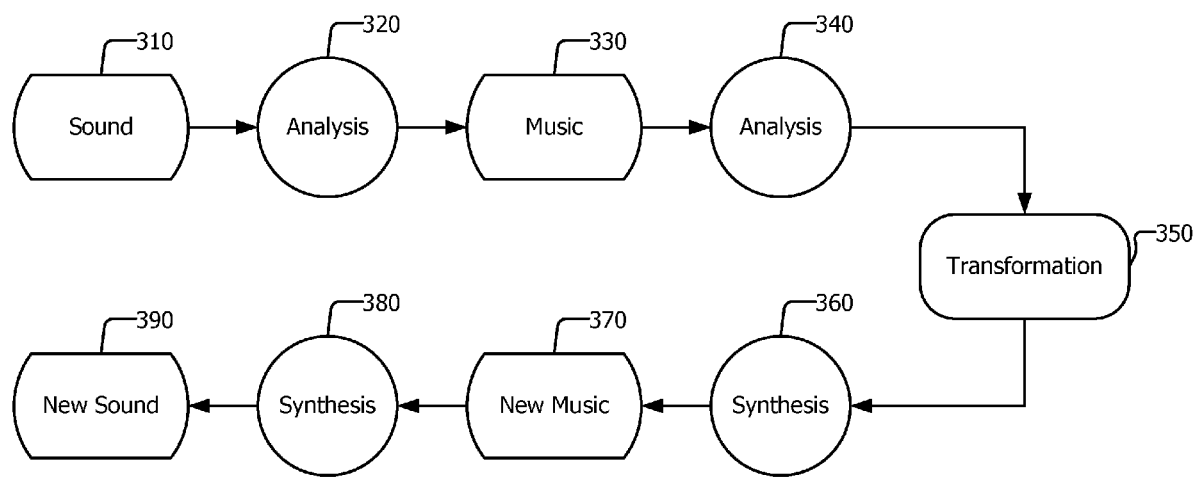
FIG. 3 is a block diagram of the actions taken according to a method of a general paradigm of music analysis and re-synthesis.

As shown in FIG. 3, the methods described herein involve music-aware analysis/re-synthesis that enables transformations independently of the sound content, including beat matching, music morphing, music cross-synthesis, music similarities. FIG. 3 is a block diagram of the actions taken according to a method of a general paradigm of music analysis and re-synthesis. A sound 310 is analyzed 320 and music 330 is perceived. Additional analysis 340 is performed. After transformation 350 is performed, synthesis 360 creates new music 370 which is further synthesized 380 to create a new sound 390.

According to the method, information of interest is simplified to its minimal form. Depending on the application, some of the information may be approximated or discarded, consequently degrading the ability to re-synthesize. If the source is available, the task consists of labeling the audio as it is being perceived, a perception modeling approach. Optimizing the amount of information required to describe a signal of given complexity may be achieved using perceptual information theory.

Figure 4:
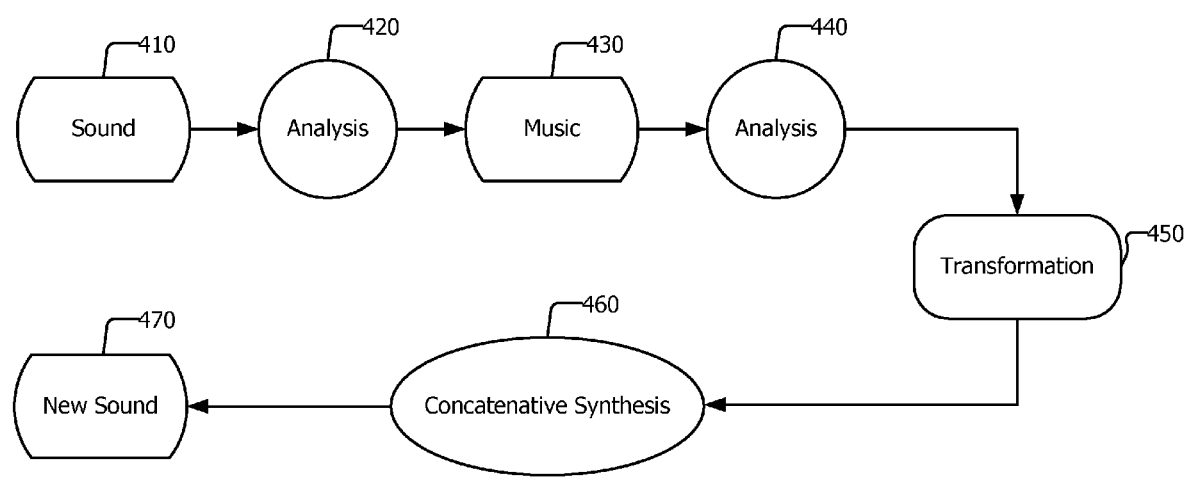
FIG. 4 is a block diagram of the actions taken according to a method of music analysis and concatenative synthesis.

Referring now to FIG. 4, the method described herein may use concatenative synthesis 460 for re-synthesizing rich sounds without having to implement signal modeling. Music listening analysis comprised of perceiving a sound 410, analyzing the sound 420 to identify music 430 which is further analyzed 440 is performed. Transformation is then performed followed by concatenative analysis 460 to create a new sound 470. Given the inherent granularity of concatenative synthesis 460, the description of the music is reduced (that is, simplified) further, resulting in acoustic metadata or music characterization. In the method of music analysis/re-synthesis described herein, the synthesis stage is a concatenative synthesis module 460. The analysis module (blocks 410, 420, 430 and 440) is referred to as music listening.

Listening cannot be disassociated from learning. Understanding the mechanisms of the human brain, in particular the auditory path, provides an answer to building perceptual models of music cognition. The method described herein attempts to mimic some of the most basic functionalities of music perception and build a virtual listener that processes, interprets, and describes music signals much like humans do.

The method described herein implements a music cognition machine that includes listening to music through deterministic signal processing algorithms. Other embodiments may use statistical learning approaches in addition to or in place of the signal processing algorithms.

Figure 5:
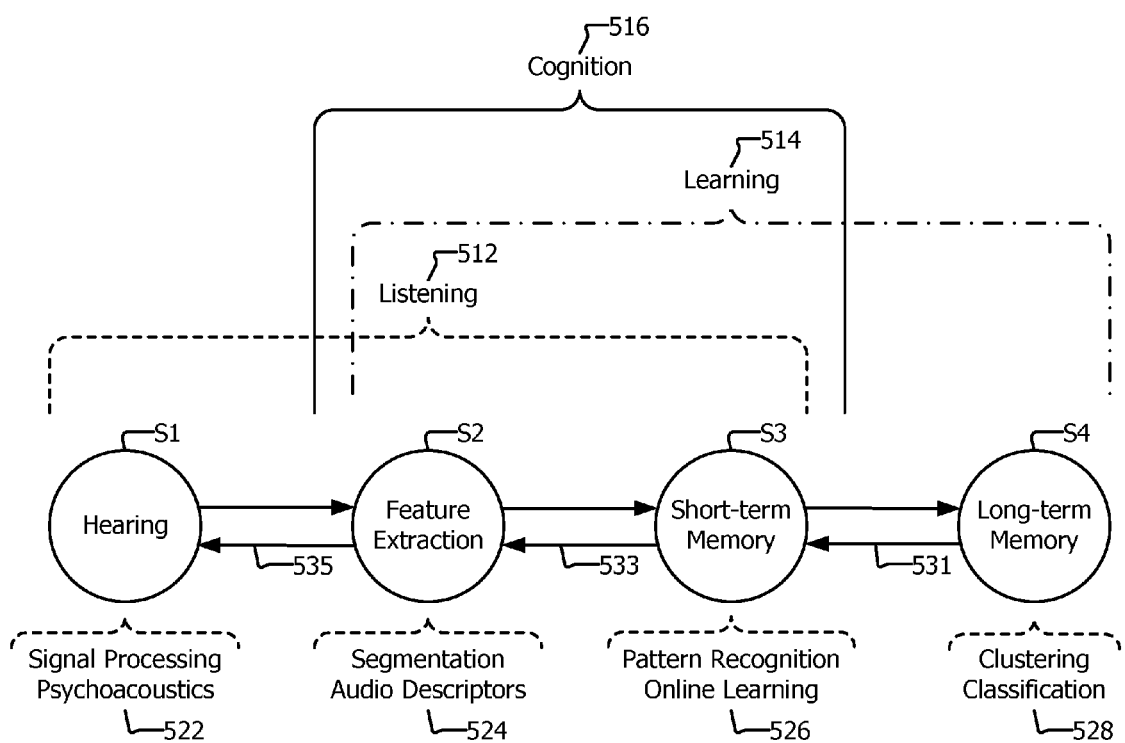
FIG. 5 is a block diagram of the actions taken according to a method of signal analysis.

The method includes a four stage signal analysis, where each stage represents a signal reduction stage of another neighboring stage, as shown in FIG. 5. Information flows from left to right between each stage. From left to right, each successive stage corresponds to a simpler, more abstract, and slower rate signal. Each of the four successive stages, (S1) hearing, (S2) feature extraction, (S3) short-term memory, and (S4) long-term memory, embody a different corresponding concept, respectively: filtering, symbolic representation, time dependency, and storage. The knowledge obtained in each stage is re-injected to some degree through all stages via a feedback shown as 531, 533 and 535.

MUSIC COGNITION 516. The first three blocks, S1, S2 and S3, represent listening shown as 512; whereas the last three blocks, S2, S3 and S4, represent learning shown as 514. We refer to the interaction between music listening 512 and music learning 514 as music cognition 516, shown as the area overlapping part of listening 512 and learning 514. However, the boundaries of music cognition are not clearly defined, and the term is used cautiously. External influences may impact music cognition by humans, including vision, culture, emotions, and others.

HEARING, Stage S1. This is a filtering stage, where the output signal only carries what is heard. In humans, the ear is physiologically limited such that only a portion of the original signal is actually heard and may represent less than 10% of the incoming signal. Signal processing 522 produces a signal that may be presented in the form of an auditory spectrogram, where what appears in the time-frequency display corresponds strictly to what is heard in the audio. The signal processing implements psychoacoustics 522. The analysis rate of this stage may be in the order of 10 ms.

FEATURE EXTRACTION, S2. This second stage converts the auditory signal received from the first stage (hearing, S1) into a symbolic representation referred to as segmentation audio descriptors 524. The output is a stream of symbols describing the music (a sort of musical-DNA sequence). During the feature extraction stage S2, sound source separation may be implemented. Perceptual features (more generally audio descriptors) may be extracted and/or the signal may be described in the form of a musical surface. In all cases, the output of this stage is a signal that is a much more compact characterization of the musical content. The analysis rate of this stage may be in the order of 100 ms.

SHORT-TERM MEMORY, S3. The signal received from the second stage is analyzed in the time-domain during this third stage. The short-term memory stage detects patterns and redundant information that may lead to certain expectations and may enable prediction. This is referred to a pattern recognition online learning 526. Short-term memory analysis may be achieved using algorithms with a built-in temporal component, such as symbolic learning, pattern matching, dynamic programming and/or hidden Markov models. The analysis rate in this stage may be in the order of 1 sec.

LONG-TERM MEMORY, S4. This last stage clusters macro information and classifies the analysis results for long-term learning. To achieve the analysis at this stage, various clustering techniques may be used, as well as regression and classification algorithms, including a mixture of Gaussian, artificial neural network, and/or support vector machines. This may be referred to as clustering classification 528. The analysis rate in this stage may be in the order of several seconds or more.

FEEDBACK. For completeness, all stages feedback to each other. The feedback in some ways replicates and/or approximates human listeners and composers' prior knowledge of the world (such as, memories and previous experiences) that alters their listening experience and general musical perception. Similarly, human listeners and composers' short-term memory (of, for example, pattern recognition and beat) drives their future prediction.

The method described herein includes machine (computer) listening and machine (computer) learning. A goal of the method is to provide a bias-free system that learns the structure of particular music by listening to song examples. By considering the structural content of music, the method performs novel transformations, or music processing, which goes beyond traditional audio processing.

Listening, Psychoacoustics and Auditory Spectrogram Creation

Figure 6:
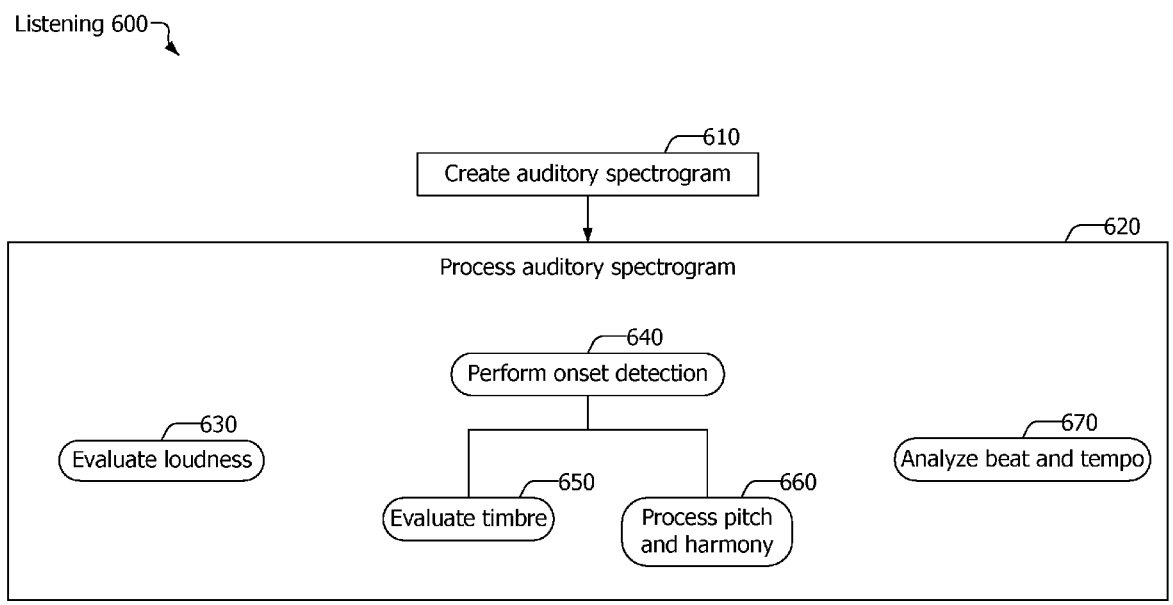
FIG. 6 is a block diagram of the actions taken to perform listening.

Referring now to FIG. 6, the listening 600 portion of the method includes creation and processing of the auditory spectrogram 610 and 620, in which processing of the auditory spectrogram 620 includes loudness evaluation 630, onset detection 640, timbre evaluation 650, pitch and harmony processing 660, and beat and tempo analysis 670, all of which are described in the following paragraphs.

The method employs a psychoacoustic approach to computer listening that produces an auditory spectrogram. Psychoacoustics is the study of subjective human perception of sounds. It connects the physical world of sound vibrations in the air to the perceptual world of things humans hear when listening to sounds. Psychoacoustics is concerned with the effect of human anatomy on listening perception. The method includes computer modeling the human perception of music through psychoacoustics. The method is causal, meaning that it does not require knowledge of the future, and can be implemented both in real time and faster than real time.

Figure 7:
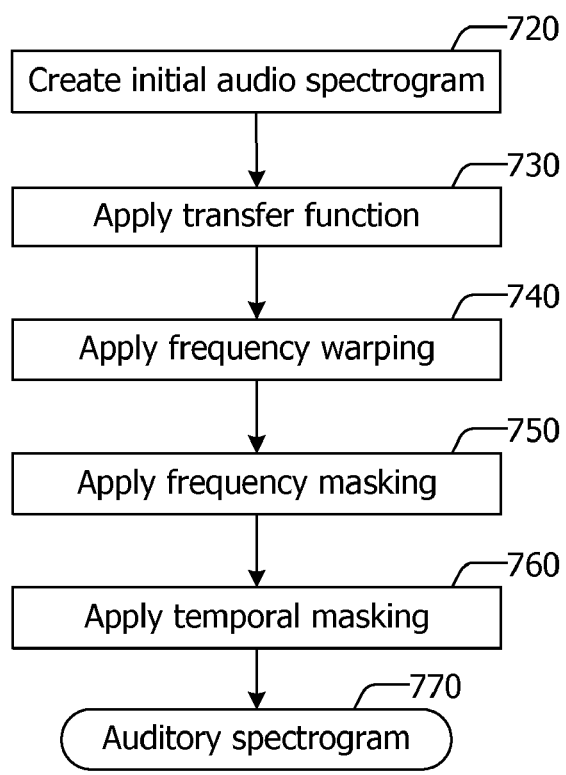
FIG. 7 is a flow chart of the actions taken to create an auditory spectrogram.

Referring now to FIG. 7, a method of auditory spectrogram creation 710 may combine five pieces—initial audio spectrogram creation 720, transfer function application 730, frequency warping 740, frequency masking 750, and temporal masking 760—together to build a hearing model in the form of an "audio surface" represented as an auditory spectrogram 770. The auditory spectrogram approximates a "what-you-see-is-what-you-hear" type of spectrogram, such that the "just visible" in the time-frequency display corresponds to the "just audible" in the underlying sound. Note that the method does not understand music at this point, but only sound. The auditory spectrogram creation described regarding FIG. 7 corresponds to block 610 of FIG. 6.

Initial Audio Spectrogram Creation 720. The auditory spectrogram is produced by converting the time-domain waveform into a reduced, yet perceptually meaningful, time-frequency representation. Information that is the least critical to human hearing sensation is removed while retaining the most important parts, thus reducing signal complexity without perceptual loss.

To produce the auditory spectrogram, first, a standard Short-Time Fourier Transform (STFT) is applied to create a standard spectrogram, an initial audio spectrogram 720. In one embodiment in which timing accuracy is favored, short windows (e.g., 12-ms Hanning), are computed every 3-6 ms (i.e., every 128-256 samples at 44.1 KHz). The Fast Fourier Transform (FFT) is zero-padded up to 46 ms to gain additional interpolated frequency bins. The power spectrum is calculated and its amplitude axis is scaled to decibels (dB SPL, a measure of sound pressure level) as in the following equation:

$$I_i(\text{dB}) = 20 \log_{10}\left(\frac{I_i}{I_0}\right)$$

where i>0 is an index of the power-spectrum bin of intensity I, and $I_0$ is an arbitrary threshold of hearing intensity. For a reasonable tradeoff between dynamic range and resolution, $I_0$=60 may be used, and sound pressure levels below −60 dB may be clipped.

Transfer Function 730. The method then applies a transfer function which represents in some ways the functioning and effect of the outer and middle ear. A transfer function proposed in "Calculating virtual pitch" by E. Terhardt in Hearing Research, vol. 1, pages 155-182, (1979) may be applied. The transfer function is defined in decibels as follows:

$$A_{dB}(f_{KHz}) = -3.64 f^{-0.8} + 6.5 \exp(-0.6(f-3.3)^2) - 10^{-3} f^4$$

Frequency Warping 740. To approximate the mechanical properties of the cochlea, which behaves as a "cochlear filterbank" the provides a roughly logarithmic decrease in bandwidth (i.e., constant-Q on a logarithmic scale) as sound moves linearly away from the cochlear opening, the method warps the spectrum frequency f is warped to the Bark scale z(f) as in the following equation from E. Zwicker and H. Fastl, "Psychoacoustics: Facts and Models" (Springer Verlag, $2^{nd}$ ed.1999):

$$z(f) = 13 \arctan(0.00076 f) + 3.5 \arctan((f/7500)^2)$$

Frequency Masking 750. Simultaneous masking is a property of the human auditory system where certain sounds disappear in the presence of so-called masker" sounds. A simple approximation of masking is a triangular function with slopes +25 dB/Bark and −10 dB/Bark, where the lower frequencies have a stronger masking influence on higher frequencies than vice versa. A more refined model is highly non-linear and may depend on both frequency and amplitude. The method may apply frequency masking according to a non-linear spreading function found in T. Painter and A. Spanias, "A Review of Algorithms for Perceptual Coding of Digital Audio Signals", Proceedings of the International Conference of Digital Signal Processing, pages 179-205 (July 1997) and modified by Bosse Lincoln in "An Experimental High-Fidelity Perceptual Audio Coder", CCRMA, Stanford University (1998):

$$SF(z) = (15.81 - i) + 7.5(z + 0.474) - (17.5 - i)\sqrt{1 + (z + 0.474)^2} \quad (1)$$

where $i = \min(5 \cdot PS(f) \cdot BW(f), 2.0)$ $$BW(f) = \begin{cases} 100 & \text{for } f < 500 \\ 0.2f & \text{for } f \geq 500 \end{cases}$$

PS is the power spectrum, and $z$ is defined above.

The method may include computing the full spectral mask through a series of individual partial differential equations.

Temporal Masking 760. The method convolves the envelope of each frequency band with a 200-ms half-Hanning (raised cosine) window. This stage induces smoothing of the spectrogram, while preserving attacks.

After creation and processing of the auditory spectrogram, the listening method evaluates loudness.

Loudness 630. Loudness is the subjective judgment of the intensity of a sound. The method derives loudness from the auditory spectrogram by adding the amplitudes across all frequency bands. Loudness may be evaluated according to the following equation:

$$L_{dB}(t) = \frac{\sum_{k=1}^{N} E_k(t)}{N}$$

where $E_k$ is the amplitude of frequency band k of total N in the auditory spectrogram. The result is a loudness curve. The loudness curve may be described with five dynamic features: loudness at onset (dB), maximum loudness (dB), loudness at offset (dB), length of the segment (ms), and time location of the maximum loudness relative to the onset (ms). According to one implementation, the loudness of a given segment is determined by the maximum value in the loudness curve.

Timbre 650. Timbre, or tone color, is defined by the American Standards Association (ASA) defines timbre as "that attribute of sensation in terms of which a listener can judge that two sounds having the same loudness and pitch are dissimilar." American Standard Acoustical Terminology. Definition 12.9. Timbre (American Standards Association, 1960, p. 45) In music, timbre is the quality of a musical note that distinguishes musical instruments. Timbre characteristics of the orchestral sounds include attack quality (temporal envelope), spectral flux (evolution of the spectral distribution over time), and brightness (spectral centroid). The method represents the timbral space of complex polyphonic signals with a meaningful, yet generic description. 25 critical Bark bands may be used as a reasonable and perceptually grounded description of the instantaneous timbral envelope. A 25 channel auditory spectrogram is produced. A rough approximation of timbre may be evaluated by averaging the Bark features of a segment over time, which reduces the timbre space to 25 Bark features per segment. The timbre evaluation may be performed on the segments created/identified during onset detection 640.

Onset Detection 640. Onset detection (or segmentation) is the means by which the musical signal is divided into smaller units of sound. This section only refers to an atomic level of segmentation, that is the smallest rhythmic events possibly found in music: individual notes, chords, drum sounds, etc. Organized in time, a sequence of sound segments infers our perception of music. A segment may represent a rich and complex polyphonic sound, usually short. Other kinds of segmentations (e.g., voice, chorus) may represent specific aggregations of minimal segments. The aggregations may require source recognition, similarity, or continuity analysis.

As used herein, a sound segment is defined by its onset and offset boundaries. A segment is assumed to be perceptually meaningful if its timbre is consistent, i.e., it does not contain abrupt changes. Typical segment onsets include abrupt loudness, pitch or timbre variations. All of these events translate naturally into an abrupt spectral variation in the auditory spectrogram.

The auditory spectrogram may be converted into an event detection function by calculating the first-order difference function of each spectral band, and by summing across channels. The resulting signal reveals peaks that correspond to onset transients. Transients within a 50-ms window typically fuse perceptually into a single event. This fusion may be modeled by convolving the raw event detection signal with a Hanning window. In one embodiment, best results (i.e., with segments greater than 50 ms) may be obtained with a 150 ms window. The filtering generates a smooth function that is appropriate for the peak-picking stage. According to this method, the local maxima is then selected. The method may reject the flattest peaks through threshold as well.

As the audio segments may be reused for synthesis (described herein), the onset location may be refined by analyzing it in relation with its corresponding loudness function. An onset typically occurs with an increase variation in loudness. To retain the entire attack and determine the best time to cut, the method seeks the previous local minimum in the loudness signal (in general a small time shift of at most 20 ms), which corresponds to the softest pre-onset moment. The corresponding waveform is examined, and a search for the closest zero-crossing is performed. This may be performed with an arbitrary but consistent choice of direction (e.g., from negative to positive). This stage is important to insure signal continuity at synthesis.

Tatum. The method is based on a moving autocorrelation computed on the smooth event-detection function described above. The window length is chosen adaptively from the duration of x past segments to insure rough salience stability in the first-peak estimation of the autocorrelation (e.g., x≈15). The autocorrelation is partially calculated since we are guaranteed to find a peak in the ±(100/x)% range around its center. The first peak gives the approximate Tatum period. To refine that estimation, and detect the phase, a search through a set of templates may be performed.

Templates are patterns or filters that may be aligned against the signal. The method may include pre-computing dozens of regular pulse trains in the range 1.5-15 Hz through a series of click trains convolved with a Hanning window. To account for memory fading, the templates may be shaped with a half-raised cosine of several seconds, e.g., 3-6 sec. The templates may be finally normalized by their total energy. At a given estimation time, the optimal template may be the one with highest energy when cross-correlated with the current smoothed detection function. To achieve maximum efficiency, only templates within the range ±10% of a rough period estimation may be estimated. Cross-correlation lag search for the optimal template may be limited to only the Tatum period length Δτ, since it contains the peak that will account for phase offset and allows for prediction of the next Tatum location. The system quickly phase locks and is efficiently updated at Tatum-period rate.

Beat and Tempo 670. The beat is a periodic pulse that may be described by the action of foot-tapping to the music. The beat defines tempo, namely, a pace reference that typically ranges from 40 to 260 beats per minute (BPM) with a mode roughly around 120 BPM. The beat is a down-sampled aligned version of the Tatum. Unlike the Tatum, which is derived directly from the segmentation signal, the beat sensation is cognitively more complex and requires information both from the temporal and the frequency domain A causal and bottom-up beat tracker based on our the auditory spectrogram (25 bands) and a bank of resonators may be used. The tracker assumes no prior knowledge, and includes a confidence value to account for the presence of a beat in the music. The range 60-240 BPM is logarithmically distributed to a large bank of comb filters, whose properties are to resonate at a given tempo. The filters may be tested on multiple frequency channels of the auditory spectrogram simultaneously. The filters may be tuned to fade out within seconds, as a way to model short-term memory. At any given time, internal energy of the filters can be summed across channels by tempo class. The result is a tempo spectrum. A few peaks of the spectrum may give a plausible answer, and choosing the highest is not necessarily the best, or most stable strategy. A template mechanism may be used to favor the extraction of the fastest tempo in case of ambiguity. If necessary, the auditory spectrogram may be down-sampled by a tempo octave.

Pitch and Harmony 660. The pitch and harmony processing 660 may be performed on the segments created/identified during onset detection 640. Pitch and harmony may be represented as a 12-dimensional chroma description or chromagram. A chromagram is a representation of chromas against time. To prepare the chromagram, the FFT of the whole segment (generally between 80 to 300 ms long) may be computed. A standard Hanning window may be applied first, which slightly attenuates the effect of noisy transients while emphasizing the sustained part of the segment. A chroma vector is the result of folding the energy distribution of much of the entire power spectrum (6 octaves ranging from C1=65 Hz to B7=7902 Hz) into 12 discrete pitch classes. The output of the 72 logarithmically spaced Hanning filters of a whole-step bandwidth—accordingly tuned to the equal temperament chromatic scale—is accumulated into a corresponding pitch class. The final 12-element chroma vector is normalized by dividing each of its elements by the maximum element value. According to this method, the effect of loudness across vectors (in time) may be cancelled while preserving the ratio between pitch classes within a vector (in frequency).

Figure 8:
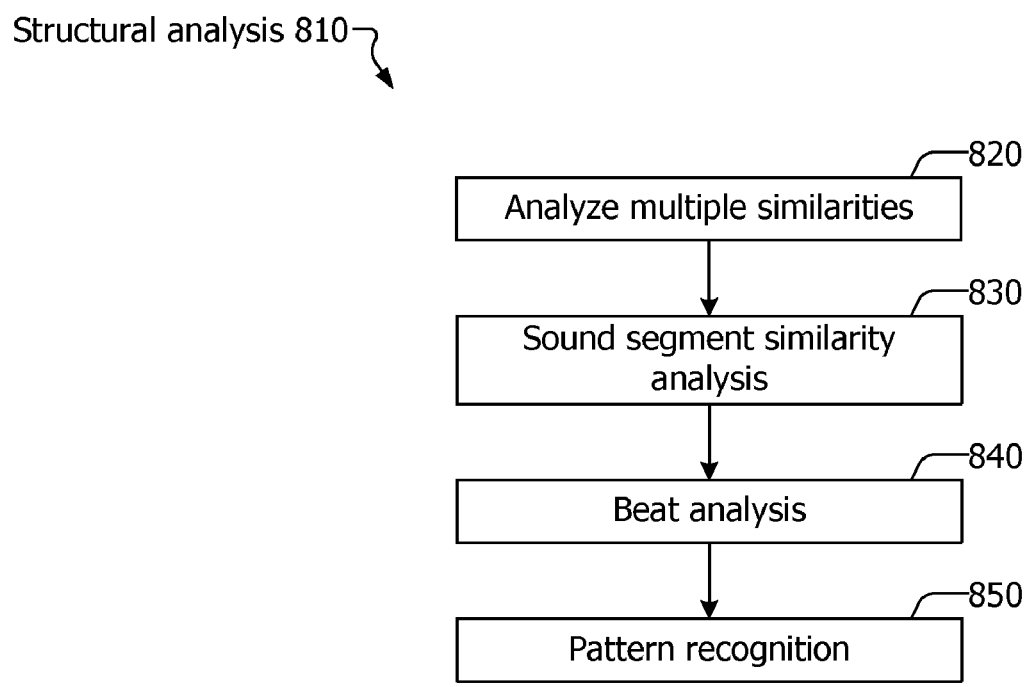
FIG. 8 is a flow chart of the actions taken to perform structural analysis.

Segments are thus labeled with a total of 5 rhythm features, 25 timbral features, and 12 pitch features for a total of 42 features. These 42 features may be considered a musical signature or signal metadata FIG. 8 is a flow chart of the actions taken to perform structural analysis 810 of music. The goal of this portion of the method is to extract higher-level musical structures from the low-level musical metadata already derived from the audio. The method may employ a recursive, multi-class (pitch, rhythm, timbre) approach to the structure analysis of acoustic similarities in music.

Multiple Similarities 820. The method may start with a series of significant segmentations, naturally derived from perceptual models of listening, and hierarchically organized. The method computes meaningful segmentations of specific perceptual characteristics such as, pitch, rhythm, and timbre, and then computes their similarity matrices of sound, beat and pattern. According to this method, multiple representations may be produced for specific applications, and segment boundaries are accurately preserved. Further, the method is independent of time (tempo) variations.

The hierarchical representation may be recursively computed. Larger matrices (lower-level) may be used to infer the smaller ones (higher-level), such that the pattern-synchronous self-similarity matrices (the smallest), are computed from the beat-synchronous self similarity matrices, which themselves are computed from the segment-synchronous self similarity matrices, which are obtained at the frame scale.

Sound Segment Similarities 830.

Timbral Similarity. The timbral similarity of the segments may be evaluated. A first approximation of D(T, R) consists of measuring the Euclidean distance (equation between the 25-dimensional feature vectors described above. However, since timbre depends highly on temporal resolution, the auditory spectrogram may be used to time align the segments using dynamic time warping. Accordingly, $d(t_i, r_j)$ is the distance between the 25-dimensional feature vectors of the auditory spectrogram, and D(T, R) is defined by the optimal path in the Dynamic Time Warping (DTW) algorithm described in Thomas H. Cormen and Charles E. Leiserson and Ronald L. Rivest and Cliff Stein, "Introduction to Algorithms (Second Edition)" (MIT Press and McGraw-Hill 2001) The Euclidean distance (equation below), defined as the straight line distance between two points, may be used since the auditory spectrogram is perceptually normalized, i.e., the geometric distance between segments is proportional to the perceptual distance, as defined psychoacoustically. The Euclidean distance may be computed for two points $x=(x_1, \ldots, x_N)$ and $y=(y_1, \ldots, y_N)$ in Euclidean N-space as:

$$D_{Euclidean} = \sqrt{\Sigma_{i=1}^{N}(x_i - y_i)^2}$$

The method may dynamically weigh the path with a half-raised cosine function, therefore increasing the alignment cost at the attack more than at the decay. Two parameters may be chosen empirically (edit cost, and a weight function value), which may be optimized. A segment-synchronous self-similarity matrix of timbre may be computed.

Pitch Similarity. The pitch similarity of segments may computed by measuring the distance between chroma vectors. The Euclidean distance may be used. Specific heuristics on the perceptual distance between chords may be incorporated: for example, CM7 may sound closer to Em7 than to C7. The dynamic-loudness similarity of segments may be computed by the DTW of the one-dimensional loudness curve.

Beat Analysis 840. Beat analysis is performed to reveal the underlying musical metric on which sounds arrange. Typically, there are from two to five segments per beat. Using the segment-synchronous timbre self-similarity matrix as a new distance function $d(t_i, r_j)$, a recursive procedure can be used to infer a beat-synchronous self-similarity matrix of timbre. Another option includes computing the similarity of beats directly from the auditory spectrogram.

Pitch similarities may be considered at the beat level as well. The beat-synchronous self-similarity matrix of pitch may be computed in a manner similar to that used to compute the beat-synchronous self-similarity matrix of timbre. Unlike sound-synchronous self-similarity matrices, beat-synchronous self-similarity matrices are perfectly normalized in time, regardless of their local tempo. This is an important consideration when comparing music, especially where tempos are not perfectly steady.

Pattern Recognition 850. Beats can be grouped into patterns, also referred to as meter, and may be indicated by a time signature in western notation, e.g., 3/4, 4/4, 12/8. This section, however, deals with patterns as perceived by humans and computers, rather than their original score notation as organized by measures.

Pattern Recognition 850. The method computes pattern similarities from a short-term version of the beat-synchronous self-similarity matrices (considering a limited section around the main diagonal). As such, the method synchronizes the analysis to the beat. The method includes iteratively running parallel tests on a beat basis, measuring the similarity between successive patterns of one beat to 11 beats long—typical patterns are 3, 4, 5, 6, or 8 beats long. The first peak may be selected; the first peak corresponds to a particular number of beats. A complete model may include all representations, such that the length L of an ideal pattern is found as the first peak in a combination of all similarities. In one embodiment the method includes choosing timbre similarities for finding the pattern length.

Heuristic Approach To Downbeat Detection. According to the method, it is assumed that chord changes occur most likely on the downbeat, as opposed to other beats. The method proceeds presuming that the length L (in number of beats) of a pattern. The dissimilarity D between two successive patterns by the Euclidean distance between their averaged chromas over L. For a given pattern i, the downbeat estimation may consist of finding the maximum likelihood $\max_{\phi}D_{\phi_j}[i]$ in a set of L dissimilarity evaluations, i.e., for all beat phase $\phi_j$, where $0 \leq j \leq L-1$.

If L can be divided by two, then it is likely that the minimum likelihood $\min_{\phi}D_{\phi_j}[i]$ occurs at opposite phase $((\phi_j+L/2) \bmod L)$ compared to the maximum likelihood. Averaging chromas over two chords is more likely to minimize dissimilarities. Therefore, a more robust method first computes the absolute difference between pairs of dissimilarities in phase opposition, and chooses the best candidate (maximum likelihood) from the pair with highest absolute difference.

Pattern-synchronous Similarities. A pattern-synchronous self-similarity matrix may be derived recursively. Pitch similarities may be derived from beat-synchronous chroma vectors, and rhythm similarities may be derived using an elaboration distance function from Mitchell Parry and Irfan Essa, Rhythmic Similarity Through Elaboration, Proceedings of the International Symposium on Music Information Retrieval (ISMIR) (Baltimore, Md., 2003) together with the loudness function described above.

Learning.

The method proceeds with learning in the form of prediction based on the results of listening described above. Prediction begins with training and classification.

Classification. Predictive models for classification involve categorizing data into a finite number of predefined classes, and for nonlinear regression, finding a smooth interpolation between points while avoiding overfitting (the problem of fitting the noise in addition to the signal). The regression corresponds to mapping a high-dimensional input data stream into a one-dimensional nonlinear output function. The resulting one-dimensional signal may be the input data to signal forecasting, described below.

Learning and Forecasting Musical Structures.

According to the method, a high-dimensional space may be projected onto a single dimension. In one embodiment, a correlation between the time-lag vector $[x_{t-(d-1)T}, \ldots, x_{x_{t-T}}]$ and the current value $x_t$. Machine learning algorithms may be used to infer the mapping, which consequently provides an insight into the underlying behavior of the system dynamics.

Given an initial set of d data points, the method can exploit the embedded geometry (long-term memory) to predict a new forthcoming data point $x_{t+1}$. By repeating the procedure even further through data points $x_{t+2}, \ldots, x_{t+(\delta-1)T}$, the method may forecast the time series even farther into the future.

The method may model rhythm in such a way, through both the iterative mixture of Gaussian framework (CWM) provided by Bernd Schoner, "Probabilistic Characterization and Synthesis of Complex Driven Systems" (PhD. Thesis, MIT Media Laboratory 2000), and a support vector machine package ($SVM^{light}$) provided by Thorsten Joachims, "Learning to Classify Text Using Support Vector Machines" (Kluwer 2002) The outcome is an extremely compact rhythm synthesizer that learns from example, and can generate a loudness function given an initialization data set. The robustness of the resulting model may be measured by its ability to predict: 1) previously trained data points; 2) new test data points; 3) the future of the time series (both short-term and long-term accuracy).

When using a support vector machine (SVM) in one implementation, preprocessing of the data is performed to represent patterns in a high dimension—typically much higher than the original feature space. With nonlinear mapping into the new space, and through the use of a basis function, or kernel—such as, for example, Gaussian, polynomial, sigmoid function—data may be regressed (and classified) with a hyperplane. Support vector machine training converges to a global minimum, i.e., the search corresponds to a convex quadratic programming problem, that may be solved by matrix inversion.

Downbeat Prediction.

The method provides for predicting new musical information given a multidimensional input. Downbeat prediction may be based on surface listening and time-lag embedded learning. Downbeat prediction may be causal and tempo independent. Downbeat prediction does not require beat tracking.

The downbeat prediction is supervised. The training included with downbeat prediction may be a semi-automatic task that requires little human control. Because the beat tracker is accurate throughout the training song, and the measure length is constant, a beat may be labeled with an integer value $p_b \in [0, M-1]$, where M is the number of beats in the measure, and where 0 is the downbeat. The method may extrapolate the beat-phase labeling to the rest of the song. In general, the data may be labeled based on tapping the downbeats of the music in real time, and by recording their location in a text file. The system finally labels segments with a phase location: a float value $p_s \in [0, M]$. The resulting segment phase signal looks like a sawtooth ranging from 0 to M. Taking the absolute value of the derivative of the segment phase signal returns a downbeat prediction signal. In another embodiment, Tatums may be labeled rather than segments.

As described above, the listening stage, including auditory spectrogram creation, segmentation, and music feature labeling, may be entirely unsupervised. The construction of the time-lag feature vector may also be unsupervised. The time-lag feature vector may be built by appending an arbitrary number of preceding multidimensional feature vectors. Six to 12 past segments, corresponding to nearly the length of a measure, may be used. Short-term memory fading may be evaluated by linearly scaling down older segments, therefore increasing the weight of most recent segments.

Training a support vector machine at predicting the downbeat may be achieved with a regression task of several dozens of feature dimensions (e.g., 9 past segments×42 features per segments=378 features) into one single dimension representing the corresponding downbeat phase of the next segment). Several variations of this principle are also possible. For example, an additional PCA step may be employed to reduce the space considerably while preserving most of its entropy. In one embodiment, the method arbitrarily selects the first 20 eigen-dimensions, which generally accounts for about 60-80% of the total entropy while reducing the size of the feature space by an order of magnitude. In another embodiment, the relative features of a running self-similarity triangular matrix are selected rather than the original absolute features (e.g., ((9 past segments)$^2$–9)/2=36 features).

Figure 9:
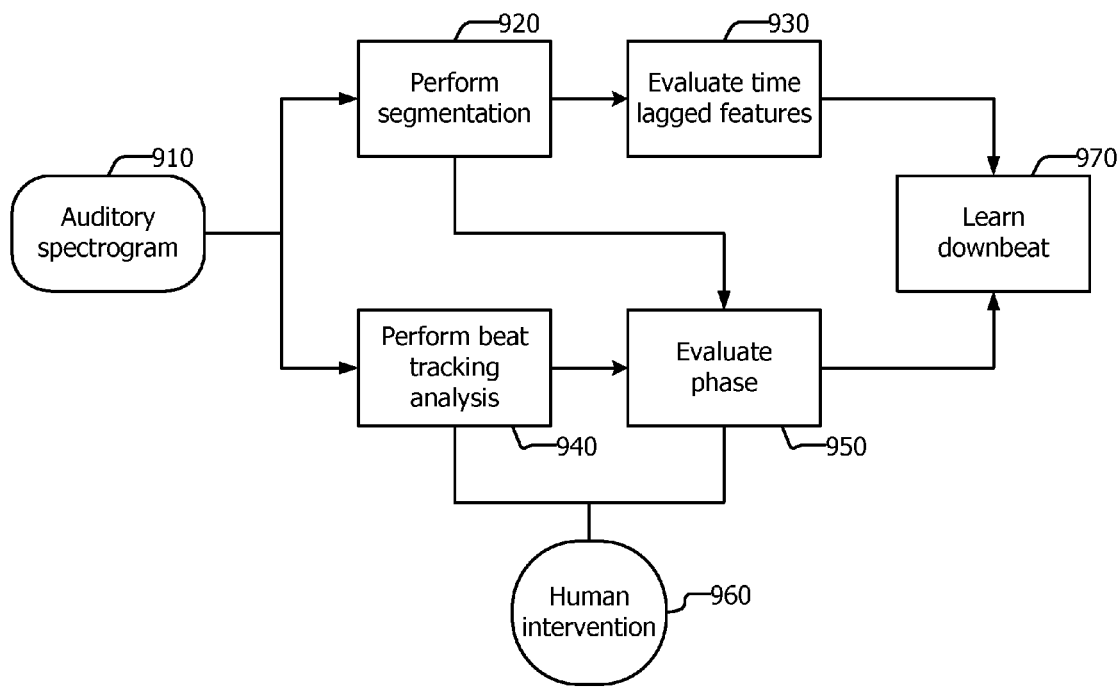
FIG. 9 is a block diagram of the actions taken to train a system for beat identification.

FIG. 9 is a block diagram of the actions taken to train a system for downbeat identification. The method predicts the downbeat of a training data set, and also generalizes well enough to predict the downbeat of new input data. Other beat identification can also be performed instead of or in addition to downbeat identification, such as, for example, identifying every third beat or every fourth beat. Referring now to FIG. 9, the method includes receiving an auditory spectrogram 910, performing segmentation 920 and analyzing time lagged features 930 independently by computer, without human intervention, and performing beat tracking analysis 940 and phase evaluation 950 with human intervention 960. Downbeat is learned as shown in block 970 based on all of the preceding.

Figure 10:
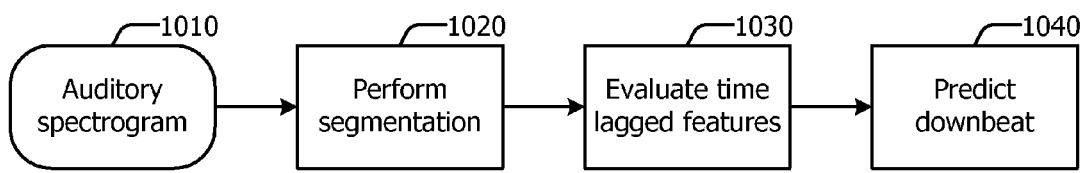
FIG. 10 is a block diagram of the actions taken in a simplified method to train a system for beat identification.

FIG. 10 is a block diagram of the actions taken in a simplified method to train a system for beat identification. In one embodiment in which 1) no periodicity is assumed; 2) the system does not require a beat tracker and is actually tempo independent; and 3) the predictor is causal, downbeat training analysis simplified. As shown in FIG. 10, the method includes receiving an auditory spectrogram 1010, performing segmentation 1020 and analyzing time lagged features 1030 to arrive at a downbeat prediction 1040. This embodiment requires no human intervention such that it is performed independently, entirely by computer.

Time-Axis Redundancy Cancellation. Time-axis redundancy cancellation may be performed using one or both of two clustering algorithms to reduce data complexity and allow for compression. The clustering algorithms are referred to herein as nonhierarchical clustering and hierarchical clustering. In nonhierarchical clustering, such as the k-means algorithm described below, the relationship between clusters is undetermined. In contrast, in hierarchical clustering repeatedly links pairs of clusters until every data object is included in the hierarchy. The goal of clustering is to group similar segments together to form clusters whose centroid or representative characterizes the group, revealing musical patterns and a certain organization of sounds in time.

Nonhierarchical k-means clustering. K-means clustering is used for partitioning (clustering) N data points into K disjoint subsets to minimize the sum-of-squares criterion:

$$J=\Sigma_{j=1}^{K}\Sigma_{n\in S_j}|x_n-\mu_j|^2$$

where $x_n$ is a vector representing the $n^{th}$ data point and $\mu_j$ is the geometric centroid of the data points in $S_j$. The number of clusters K must be selected at onset. The data points are assigned at random to initial clusters, and a re-estimation procedure finally leads to non-optimized minima. In another embodiment, spectral clustering consisting roughly of a k-means method in the eigenspace may be implemented.

The method may begin with the segment metadata as described above. When using k-means, perceptually similar segments fall in the same region of the space. According to the method, an arbitrary small number of clusters is chosen depending on the targeted accuracy and compactness. The method is comparable to vector quantization: the smaller the number of clusters, the smaller the lexicon and the stronger the quantization. A short audio excerpt at various segment ratios may be defined as the number of retained segments, divided by the number of original segments. Redundant segments get naturally clustered.

Agglomerative Hierarchical Clustering. Agglomerative hierarchical clustering is a bottom-up procedure that begins with each object as a separate group. The groups may be successively combined based on similarity until there is only one group remaining, or a specified termination condition is satisfied. For n objects, n−1 mergings are performed. Agglomerative hierarchical methods produce dendrograms.

An implementation of agglomerative hierarchical clustering may begin with a similarity matrix as described above. Segment pairs are ordered by forming clusters hierarchically, starting with the most similar pairs. At each particular stage the method joins together the two clusters that are the closest to each other (most similar). The method may be implemented in different ways based on a defined distance (or similarity) between clusters. The most basic agglomerative model is single linkage, also called nearest neighbor. In single linkage, an object is linked to a cluster if at least one object in the cluster is the closest. An object may join a cluster when its similarity to all the elements in that cluster is equal to or greater than the considered level. Other methods include average linkage clustering, average group, and Ward's linkage.

Use of hierarchical clustering may allow for 1) taking advantage of already computed perceptual similarity matrices; 2) automatically adapting the number of clusters to the redundancy of the music; and 3) selecting the level of resolution by defining a similarity threshold. When the similarity threshold is high (fewer clusters), the method leads to rough quantizations of the musical description. When the similarity threshold is low (more clusters) so that it barely represents the just-noticeable difference between segments (a perceptual threshold), the method allows for reduction in the complexity of the description without altering its perception: redundant segments get clustered, and are stored only once. This leads compression.

Compression. Compression is the process by which data is reduced into a form that minimizes the space required to store or transmit it. Applying perceptual clustering reduces the audio material to the most perceptually relevant segments by retaining only one representative (near centroid) segment per cluster. These segments can be stored along with a list of indexes and locations. Resynthesis of the audio consists of juxtaposing the audio segments from the list at their corresponding locations.

If the threshold is chosen too high, too few clusters may result in musical distortions at resynthesis, i.e., the sound quality is fully maintained, but the musical syntax may audibly shift from its original form. In one embodiment, a preferred threshold is theoretically a constant value across songs. This constant may be defined through empirical listening with human subjects and may be set by hand. The clustering algorithm relies on a matrix of segment similarities as described above. Using the agglomerative clustering strategy with additional supervised feedback, the distance-measure parameters of the dynamic programming algorithm (i.e., parameter h and edit cost described above) can be optimized to minimize the just-noticeable threshold, and equalize the effect of the algorithm across large varieties of sounds.

In one embodiment, the method compares and concatenates segments as raw material; there is no attempt to transform the audio itself. In another embodiment, the method estimates similarities independently of perceptual criteria, such as loudness, duration, aspects of equalization or filtering, and possibly pitch. Resynthesis would consist of transforming parametrically the retained segment (e.g., amplifying, equalizing, time-stretching, pitch-shifting, etc.) in order to match its target more closely.

Composing.

The method described herein composes music from a database of sound segments. The sound segments may be of variable sizes, usually ranging from 60 to 300 ms. The sound segment may be extracted from a catalog of musical samples and songs, e.g., an MP3 collection. The sound segments can be rearranged into sequences which themselves are derived from timbral, harmonic, and rhythmic structures extracted, learned, and/or transformed from existing songs. Generative algorithms and processing may also be used in addition to or in place of this rearrangement of sequences. In one embodiment the method manipulates entire sections of songs by smoothly transitioning between them. Shorter segments from songs may also be manipulated in a similar manner.

Beat-matching. The method may include beat-matching and cross-fading songs or segments as smoothly as possible. The goal is to select songs with similar tempos, and align their beat over the course of a transition while cross-fading their volumes. The beat markers, as discussed above are particularly relevant features. The length of a transition may be chosen by the user or the computer. The length of a transition may be from no transition to the length of an entire song. The length of a transition may be chosen through the detection of salient changes of structural attributes. Beat-matching may be extended to downbeat matching by making sure that downbeats align. In one embodiment, the location of a transition is chosen by selecting the most similar rhythmic pattern between the two songs as discussed above regarding pattern synchronous similarities. The analysis may be restricted to finding the best match between specific sections of the songs, such as, for example, the last 30 seconds of a first song and the first 30 seconds of a second song.

To ensure a close to perfect match over the course of long transitions between songs or segments, the playback speed of the music may be adjusted through specialized mechanisms. On a phonograph turntable this may be achieved with a relative-speed controller which may be specified as a relative positive/negative percentage of the original speed. Digitally, a similar effect may be implemented by sampling-rate conversion of the audio signal. This procedure, however, may distort the perceptual quality of the music by detuning the whole sound. To correct this artifact, i.e., detuning, a time-scaling algorithm may be implemented. The time-scaling algorithm may be capable of speeding up or slowing down the music without affecting the pitch.

Time-scaling. There are three main classes of audio time-scaling or time-stretching: 1) the time-domain approach, which involves overlapping and adding small windowed fragments of the waveform; 2) the frequency-domain approach, which is typically accomplished through phase-vocoding; and 3) the signal-modeling approach, which consists of changing the rate of a parametric signal description, including deterministic and stochastic parameters. The methods described herein may incorporate the time-domain and frequency-domain methods, with certain original properties added to them. For instance, in an implementation of the time-domain algorithm the method preserves transients unprocessed to reduce artifacts, due to the granularity effect of windowing. For each sound segment, the amount of required stretch is pre-calculated, and a fixed size overlap-add algorithm is applied onto the decaying part of the sound. In a frequency implementation, a segment-long FFT is computed to gain maximum frequency resolution (assuming stationary frequency content throughout the segment), and time-scale the strongest partials of the spectrum during decay, using an improved phase-vocoding technique, i.e., by preserving the correlation between phases of adjacent bins for a given partial. In some circumstances the frequency implementation performs well with harmonic sounds, but does not do as well with noisier sounds, so the simple and more consistent time-domain approach is used.

There are several options of cross-fading that may be used, the most common being linear, exponential, S-type, and constant-power. A constant-power cross-fader may be implemented to preserve the perceptual energy constant through the transition. This may be implemented with a logarithmic fade curve that starts quickly and slowly tapers off towards the end. To avoid clipping when two songs overlap, a simple compression algorithm may be implemented. Finally, the method may adapt continuously to tempo variations by interpolating gradually one tempo into another over the course of a transition, and by time stretching every audio segment appropriately to preserve perfect beat alignment. Beat-matching and automatic transitions are successfully accomplished for arbitrary songs where tempos differ by up to 40%. In an interesting variant of the application, transitions of a song with itself, allow for extensions of that song to infinity.

A sound segment represents the largest unit of continuous timbre, and the shortest fragment of audio in our representation. This patent is concerned with synthesizing music, i.e., the structured juxtaposition of sounds over time. The method herein uses the sound segments found in existing pieces as primitive blocks for creating new pieces.

Synthesis. The synthesis principle used herein is simple: audio segments are concatenated (or strung together) as a way to create new musical sequences that never existed before. Our concatenation module does not process the audio: there is no segment overlap, windowing, or cross-fading involved, which is typically the case with granular synthesis, in order to avoid discontinuities. Since segmentation is performed psychoacoustically at the most strategic location (i.e., just before an onset, at the locally quietest moment, and at zero-crossing), the transitions are generally artifact-free and seamless.

Restoration.

A well defined synthesis application that derives from segment concatenation consists of restoring corrupted audio files, and streaming music on the internet or cellular phones. Some audio frames may be corrupted, due to a defective hard-drive, or missing, due to lost packets. A goal is to replace the corrupt region by original new material taken from the rest of the file. The problem differs greatly from traditional restoration of degraded audio material such as old tapes or vinyl recordings, where the objective is to remove clicks, pops, and background noise. These are typically fixed through autoregressive signal models, and interpolation techniques. Instead, the method deals with localized digital corruption of arbitrary length, where standard signal filtering methods do not easily apply. The method can deal with much larger corrupt fragments, e.g., of several seconds. The method provides multiple solutions, depending on the conditions: 1) file with known metadata, 2) streaming music with known metadata, 3) file with unknown metadata, 4) streaming music with unknown metadata.

The metadata describing the segments and their location is extremely small compared to the audio itself (i.e., a fraction of a percent of the original file). Even the self-similarity matrices are compact enough so that they can easily be embedded in the header of a digital file (e.g., MP3), or sent ahead of time, securely, in the streaming case. Through similarity analysis, we find segments that are most similar to the ones missing, and we concatenate a new audio stream in place of the corruption. Knowing the music structure in advance allows us, to recover the corrupt region with descent quality, sometimes hardly distinguishable from the original. Harder cases naturally include music with lyrics, where the new lyrics make no sense. We consider the real-time case: the application is causal, and can synthesize the new music using past segments only. This application applies to streaming music. The quality generally improves as a function of the number of segments available.

Two more solutions include not knowing anything about the music beforehand. In such case, we cannot rely on the metadata file. In a non-real-time process, we can run the full analysis on the corrupt file and try to infer the missing structure: the previous procedure applies again. Since detecting regions of corruption is a different problem in itself, we are not considering it here, and we delete the noise by hand, replacing it by silence. We then run the segmentation analysis, the beat tracker and the downbeat detector. We assume the tempo sufficiently steady during the silent regions and let the beat tracker run through them. The problem becomes a constraint-solving problem that consists of finding the smoothest musical transition between the two boundaries. This could be achieved efficiently through dynamic programming, by searching for the closest match between: 1) a sequence of segments surrounding the region of interest (reference pattern), and 2) another sequence of the same duration to test against, throughout the rest of the song (test pattern). We choose to fully unconstrain the procedure.

Music Textures.

A true autonomous music synthesizer should invent new music. This is a more complex problem than restoration that requires being able to learn from the time and hierarchical dependencies of dozens of parameters. Given a short musical excerpt, we generate an infinite version of that music with identical tempo, that sounds similar, but that never seems to repeat. We call this new medium music texture.

Our implementation gives convincing results. The downbeat analysis allowed us to label every segment with their relative location in the measure (i.e., a float value t∈|0, L|, where L is the length of the pattern). We create a music texture by relative metrical location similarity. That is, given a relative metrical location $t[i] \in |0, L|$, we select the segment whose relative metrical location is the closest to t|i|. We paste that segment and add its duration $d_s$, such that $t|i+1|=(t|i|+\delta_s)$ mod L, where mod is the modulo. The procedure may be iterated indefinitely. It was found that the method may quickly fall into a repetitive loop. To cope with this limitation, and allow for variety, a tiny bit of jitter, i.e., a few percent of Gaussian noise $\epsilon$ may be introduced to the system, which is counteracted by an appropriate time stretching ratio c:

$$t[i+1] = (t[i] + c \cdot \delta_s + \varepsilon[i]) \bmod L \quad (1)$$
$$= (t[i] + \delta_s) \bmod L \quad (2)$$

While preserving its perceive rhythm and metrical structure, the new music never seems to repeat. The system is tempo independent: we can synthesize the music at an arbitrary tempo using time-scaling on every segment, as above regarding timescaling. If the source includes multiple harmonies, the system creates patterns that combine them all.

Music Cross-Synthesis

Cross-synthesis is a technique used for sound production, whereby one parameter of a synthesis model is applied in conjunction with a different parameter of another synthesis model. Physical modeling, linear predictive coding (LPC), or the vocoder, for instance, enable sound cross-synthesis. We extend that principle to music by synthesizing a new piece out of parameters taken from other pieces. In one implementation, we take the music structure description of a target piece (i.e., the metadata sequence, or musical-DNA), and the actual sound content from a source piece (i.e., a database of unstructured labeled audio segments), and create a completely new cross-synthesized piece that accommodates both characteristics.

Another implementation, however, differs in the type of metadata considered, and more importantly, the event-alignment synthesis method described above. Indeed, the implementation strictly preserves musical edges, and thus the rhythmic components of the target piece. The search is based on segment similarities. Convincing results were found using timbral and dynamic similarities. Given the inconsistent variability of pitches between two distinct pieces (often not in the same key), it was found that it is usually more meaningful to let that space of parameters constraint-free.

This method can be extended to larger collections of songs, increasing the chances of finding more similar segments, and therefore improving the closeness between the synthesized piece and the target piece. When the source database is small, it is usually found useful to primarily align source and target spaces in order to maximize the variety of segments used in the synthesized piece. This is done by normalizing both means and variances of MDS spaces before searching for the closest segments. The search procedure can be greatly accelerated after a clustering step described above, which dichotomizes the space in regions of interest. The hierarchical tree organization of a dendrogram is an efficient way of quickly accessing the most similar segments without searching through the whole collection. Additional improvements in the synthesis might include processing the selected segments through pitch-shifting, time-scaling, amplitude-scaling, etc.

The resulting new piece is musically meaningful in the sense that its rhythmic structure is preserved, and its timbral structure is made as close as possible to the target piece given the inherent constraints.

Putting it all Together.

The final goal is to automate the creation of entirely new compositions. A current method arbitrarily combines the previous applications. The system already allows us to build entire pieces with only little guidance from a user. For instance, he or she may select a set of songs that represent the source database, and a set of songs that represent the target musical structures. The system can build arbitrarily long structures, and seamlessly transition between them. It can map groups of sounds to the structures, and merge several creations via alignment and tempo curve-matching. The final outcome is a new sounding piece with apparent coherence in both the use of the sound palette, and the underlying musical structure. Due to inherent constraints of the analysis-resynthesis method, the created music is new and different from other existing music.

The method creates music by listening to audio examples. The method automates the life cycle of listening, composing, and performing music, only feeding the system with a song database. The bias-free system includes generic listening and learning primitives, and analyzes the sounds and structures of music uniformly from the ground up. The method arbitrarily combines the extracted musical parameters as a way to synthesize new and musically meaningful structures. These structures may be used to drive a concatenative synthesis module that recycles audio material from the sound database itself, creating an original song with convincing quality in sound and form.

Closing Comments

The foregoing is merely illustrative and not limiting, having been presented by way of example only. Although examples have been shown and described, it will be apparent to those having ordinary skill in the art that changes, modifications, and/or alterations may be made.

With regard to flowcharts, additional and fewer steps may be taken, and the steps as shown may be combined or further refined to achieve the methods described herein. Acts and features discussed in connection with one embodiment are not intended to be excluded from a similar role in other embodiments.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

It is claimed:

1. A method performed by a computing device to create new music, the method comprising:
   the computing device listening to a plurality of music including receiving through an audio interface live or recorded music or reading a music file from a storage medium, the listening including creating an auditory spectrogram of the plurality of music
   the computing device learning from the auditory spectrogram of the plurality of music
   the computing device performing concatenative synthesis based on sound segments prepared during the listening and the learning to create the new music, the performing concatenative synthesis including
     performing beat matching on the sound segments
     performing time scaling on the sound segments
     performing cross synthesis on the sound segments.

2. The method of claim 1 wherein listening comprises:
   performing signal processing on the plurality of music
   preparing segmented audio descriptors based on the plurality of music
   recognizing patterns in the plurality of music.

3. The method of claim 1 wherein learning comprises:
   preparing segmented audio descriptors based on the plurality of music
   recognizing patterns in the plurality of music
   classifying clusters in the plurality of music.

4. The method of claim 1 wherein listening comprises:
   evaluating loudness indentified in the auditory spectrogram of the plurality of music
   evaluating timbre of the auditory spectrogram of the plurality of music
   performing onset detection of the auditory spectrogram of the plurality of music to create the sound segments
   analyzing beat and tempo of the auditory spectrogram of the plurality of music
   processing pitch and harmony using the sound segments created in the onset detection.

5. The method of claim 1 wherein creating an auditory spectrogram comprises:
   creating an initial audio spectrogram based on the plurality of music
   applying a transfer function to the initial audio spectrogram
   applying frequency warping to the initial audio spectrogram
   applying frequency masking to the initial audio spectrogram
   applying temporal masking to the initial audio spectrogram.

6. The method of claim 1 wherein listening includes performing structural analysis.

7. The method of claim 6 wherein performing structural analysis comprises:
   performing sound segment analysis on the plurality of music
   performing beat analysis on the plurality of music
   performing pattern recognition on the plurality of music.

8. The method of claim 1 wherein learning comprises:
   performing prediction analysis on the plurality of music
   performing downbeat prediction analysis on the plurality of music
   performing clustering analysis on the plurality of music.

9. The method of claim 8 wherein performing downbeat prediction comprises:
   performing segmentation on the auditory spectrogram
   evaluating time lagged features.

10. A method performed by a computing device to create new music, the method comprising:
    the computing device listening to a plurality of music including receiving through an audio interface live or recorded music or reading a music file from a storage medium, wherein listening includes
      performing signal processing of the plurality of music
      preparing segmented audio descriptors for the plurality of music
      recognizing patterns in the plurality of music
    the computing device learning from the plurality of music, wherein the learning includes
      preparing additional segmented audio descriptors for the plurality of music
      recognizing additional patterns in the plurality of music
      classifying clusters in the plurality of music based on the additional segmented audio descriptors and the additional patterns
    the computing device performing concatenative synthesis based on the segmented audio descriptors and sound segments prepared during the listening and the learning to create the new music, wherein the concatenative analysis includes
      performing beat matching analysis on the sound segments and the segmented audio descriptors
      performing time scaling of the sound segments and the segmented audio descriptors performing cross synthesis of the sound segments and
the segmented audio descriptors.

11. A computing device to create new music, the computing device comprising:
    a processor
    a memory coupled with the processor
    an audio interface coupled with the processor
    a storage medium having instructions stored thereon which when executed cause the computing device to perform actions comprising
    listening to a plurality of music including receiving through the audio interface live or recorded music or reading a music file from the storage medium, the listening including creating an auditory spectrogram of the plurality of music
        learning from the auditory spectrogram of the plurality of music
        performing concatenative synthesis based on sound segments prepared during the listening and the learning to create the new music, the concatenative synthesis including
            performing beat matching on the sound segments
            performing time scaling on the sound segments
            performing cross synthesis on the sound segments.

12. The computing device of claim 11 wherein listening comprises:
    performing signal processing on the plurality of music
    preparing segmented audio descriptors based on the plurality of music
    recognizing patterns in the plurality of music.

13. The computing device of claim 11 wherein learning comprises:
    preparing segmented audio descriptors based on the plurality of music
    recognizing patterns in the plurality of music
    classifying clusters in the plurality of music.

14. The computing device of claim 11 wherein listening comprises:
    evaluating loudness indentified in the auditory spectrogram of the plurality of music
    evaluating timbre of the auditory spectrogram of the plurality of music
    performing onset detection of the auditory spectrogram of the plurality of music to create the sound segments
    analyzing beat and tempo of the auditory spectrogram of the plurality of music
    processing pitch and harmony using the sound segments created in the onset detection.

15. The computing device of claim 11 wherein creating an auditory spectrogram comprises:
    creating an initial audio spectrogram based on the plurality of music
    applying a transfer function to the initial audio spectrogram
    applying frequency warping to the initial audio spectrogram
    applying frequency masking to the initial audio spectrogram
    applying temporal masking to the initial audio spectrogram.

16. The computing device of claim 11 wherein listening includes performing structural analysis.

17. The computing device of claim 16 wherein performing structural analysis comprises:
    performing sound segment analysis on the plurality of music
    performing beat analysis on the plurality of music
    performing pattern recognition on the plurality of music.

18. The computing device of claim 11 wherein learning comprises:
    performing prediction analysis on the plurality of music
    performing downbeat prediction analysis on the plurality of music
    performing clustering analysis on the plurality of music.

19. The computing device of claim 18 wherein performing downbeat prediction comprises:
    performing segmentation on the auditory spectrogram
    evaluating time lagged features.

20. A storage medium having instructions stored thereon which when executed by a processor cause the processor to perform actions comprising:
    listening to a plurality of music including receiving through an audio interface live or recorded music or reading a music file from the storage medium, the listening including creating an auditory spectrogram of the plurality of music
    learning from the auditory spectrogram of the plurality of music
    performing concatenative synthesis based on sound segments prepared during the listening and the learning to create new music, the concatenative synthesis including
        performing beat matching on the sound segments
        performing time scaling on the sound segments
        performing cross synthesis on the sound segments.

21. The storage medium of claim 20 wherein listening comprises:
    performing signal processing on the plurality of music
    preparing segmented audio descriptors based on the plurality of music
    recognizing patterns in the plurality of music.

22. The storage medium of claim 20 wherein learning comprises:
    preparing segmented audio descriptors based on the plurality of music
    recognizing patterns in the plurality of music
    classifying clusters in the plurality of music.

23. The storage medium of claim 20 wherein listening comprises:
    evaluating loudness indentified in the auditory spectrogram of the plurality of music
    evaluating timbre of the auditory spectrogram of the plurality of music
    performing onset detection of the auditory spectrogram of the plurality of music to create the sound segments
    analyzing beat and tempo of the auditory spectrogram of the plurality of music
    processing pitch and harmony using the sound segments created in the onset detection.

24. The storage medium of claim 20 wherein creating an auditory spectrogram comprises:
    creating an initial audio spectrogram based on the plurality of music
    applying a transfer function to the initial audio spectrogram
    applying frequency warping to the initial audio spectrogram
    applying frequency masking to the initial audio spectrogram applying temporal masking to the initial audio spectrogram.

25. The storage medium of claim 20 wherein listening includes performing structural analysis.

26. The storage medium of claim 25 wherein performing structural analysis comprises:
performing sound segment analysis on the plurality of music
performing beat analysis on the plurality of music
performing pattern recognition on the plurality of music.

27. The storage medium of claim 20 wherein learning comprises:
performing prediction analysis on the plurality of music
performing downbeat prediction analysis on the plurality of music
performing clustering analysis on the plurality of music.

28. The storage medium of claim 27 wherein performing downbeat prediction comprises:
performing segmentation on the auditory spectrogram
evaluating time lagged features.

* * * * *